United States Patent [19]

Demiryont

[11] Patent Number: 4,837,592

[45] Date of Patent: Jun. 6, 1989

[54] METHOD OF MAKING AN ELECTROCHROMIC LAYER AND NEW ELECTROCHROMIC DEVICE MADE THEREFROM

[75] Inventor: Hulya Demiryont, Dearborn, Mich.

[73] Assignee: Ford Motor Company, Dearborn, Mich.

[21] Appl. No.: 137,630

[22] Filed: Dec. 24, 1987

[51] Int. Cl.⁴ .......................... G02F 1/01; G02F 1/17
[52] U.S. Cl. .................................................. 350/357
[58] Field of Search ................ 350/357, 355, 356, 353

[56] References Cited

U.S. PATENT DOCUMENTS

| | | | |
|---|---|---|---|
| 4,326,777 | 4/1982 | Kohara | 350/357 |
| 4,375,318 | 3/1983 | Giglia et al. | 350/357 |
| 4,693,564 | 9/1987 | Mori | 350/357 |
| 4,712,879 | 12/1987 | Lynam et al. | 350/357 |
| 4,715,691 | 12/1987 | Sata et al. | 350/357 |

*Primary Examiner*—Eugene R. Laroche
*Assistant Examiner*—Nathan W. McCutcheon
*Attorney, Agent, or Firm*—Lorraine S. Melotik; Roger L. May

[57] ABSTRACT

This invention teaches an electrochromic device in which an electrochromic layer is positioned between two electrodes. The electrochromic layer comprises an inorganic based bulk material supporting electrochromic particles and ion producing particles in fixed but generally distributed positions therewithin. The bulk material permits migration of ions produced by the ion producing particles to and from the electrochromic particles upon change in voltage between the first and second electrodes. The bulk material also prohibits the passage of electrons therethrough when a voltage is applied between the first electrode and the second electrode, whereby an electric field is built up between the first and second electrodes which causes migration of the ions. A preferred method of making a material which can form an electrochromic layer is also disclosed.

22 Claims, 2 Drawing Sheets

FIG.1  CATHODIC MATERIAL
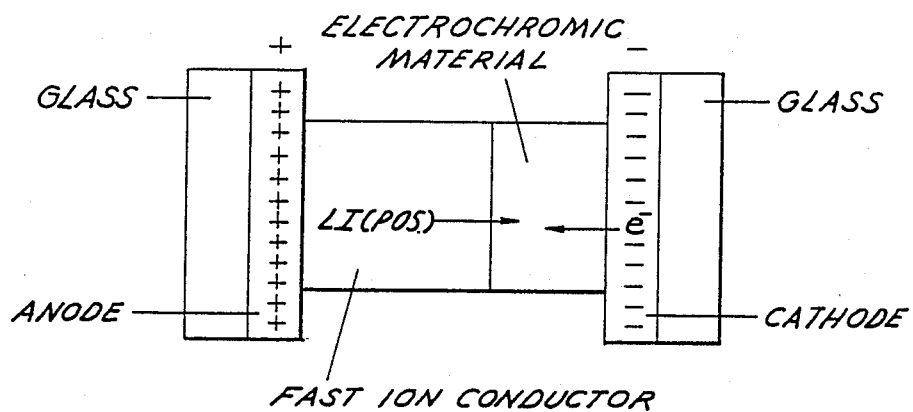
REDUCTION   - GAIN OF ELECTRONS
   LI(POS.)  AND  e⁻(NEG.)  INCLUSION
OR LI(NEG.)  AND  HOLE  EXTRACTION
FIG.2  ANODIC MATERIAL
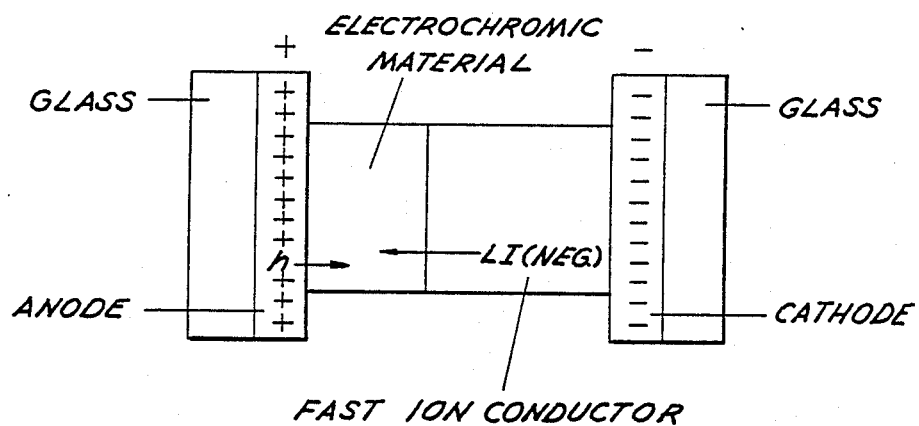
OXIDATION   - LOSS OF ELECTRONS
   LI(NEG.)  AND  HOLE  INCLUSION
OR LI(POS.)  AND  e⁻(NEG.) EXTRACTION

METHOD OF MAKING AN ELECTROCHROMIC LAYER AND NEW ELECTROCHROMIC DEVICE MADE THEREFROM

BACKGROUND OF THE INVENTION

1. Field of the Invention

This invention relates to a method of making an electrochromic layer and a new electrochromic device made therefrom.

2. Description of the Related Art

In order to better understand my inventive contributions, I will first undertake a general discussion of electrochromic behavior in electrochromic materials. Electrochromism is a coloring phenomenon observed in some materials when they are placed in the presence of an electrical field. Such materials are normally uncolored when no electrical field is present, but change to a colored state when an electrical field is placed therearound.

Such a material exhibiting reversible color changes is known as an electrochromic material (ECM). This electrical field dependent transition phenomenon from an uncolored state to a colored state is called optical switching. If a thin coating of such an ECM is placed on a glass support, the entire device is known as a switchable window. When no electrical field is placed on the ECM, it is uncolored and transparent and thus one can look through the window. On the other hand, when an electric field is placed on the ECM, it colors thereby reducing the amount of light transmitted through the window. The reduction of light transmission may be partial or total thereby either reducing the amount of light which passes through the window or eliminating it altogether.

Certain transition metal oxides are known to exhibit electrochromism. Materials such as tungsten oxide, molybdenum oxide, and vanadium oxide are known electrochromic materials.

Electrochromic materials can be divided into two categories depending on the mode of operation of the ECM. The ECM can be either a cathodic ECM or it can be an anodic ECM. The operation of these two types of ECM will be understood by reference to FIGS. 1 and 2.

In FIG. 1, the operation of a cathodic ECM is schematically illustrated. In the cathodic case, an electrochromic material of the cathodic type is physically located next to a cathode which has been placed, for example, on a glass substrate. A fast ion conductor material, which produces light ions of a positive charge, for example, lithium ions, is placed between the electrochromic material and an anode which also may be placed on a glass substrate.

In the cathodic case, the electrochromic material is subjected to a reduction or gain of electrons when an electric field is applied thereto. Application of the electric field is indicated by the plurality of plus signs shown on the anode and the plurality of negative signs shown on the cathode. As a result of the application of an electric field applied between the anode and the cathode of appropriate strength and sign, positive light ions are driven from the fast ion conductor into the electrochromic material and electrons are supplied to the electrochromic material from the cathode.

The positively charged light ions and the negatively charged electrons associate themselves with the electrochromic material to reduce the same thereby moving the electrochromic material from a base state to a reduced state. In the base state, the electrochromic material is uncolored, but in its reduced state, it is colored.

When the electric field is removed, the electrochromic material will return to its base state, that is, its uncolored state. The period of time required for return of the material to its uncolored state varies from material to material and is generally referred to as the memory of the ECM. Some materials have relatively short memories and others have prolonged memories.

While the operation of the cathodic material has been illustrated by the inclusion in the electrochromic material of positive light ions and negative electrons, the cathodic operation may also take place by the extraction of negative light ions and holes from the electrochromic material respectively to the fast ion conductor and the cathode.

Operation of an anodic ECM is schematically illustrated in FIG. 2. In this case, the electrochromic material is located next to the anode and the fast ion conductor is located between the electrochromic material and the cathode. In the anodic operation, oxidation of the ECM takes place, that is, electrochromism occurs when the ECM loses electrons. The loss of electrons in this case is illustrated by the application of an electric field represented by a plurality of pluses on the anode and the plurality of minuses at the cathode.

In the case of an anodic ECM, when an electric field is applied between the anode and the cathode of appropriate strength and sign, negative light ions, such as hydroxyl ions, move from the fast ion conductor into the ECM, and holes moves into the ECM from the anode. As a result of this movement, the ECM loses electrons thereby being oxidized away from its base or uncolored state to a colored state. Once again, the anodic material will return to its base state when the electric field is released. The time of return to its uncolored state again depends on the memory of the ECM.

The anodic ECM may also operate by extracting from the ECM positive light ions and negative electrons respectively to the fast ion conductor and the anode. In this case, the ECM is also oxidized to a colored state.

In general, in either the cathodic ECM or the anodic ECM, the coloring observed in the material is an electrochemical phenomenon produced by the application of an electric field on the ECM to move it from a base condition to a nonbase condition. By applying a field of required strength and direction to cause activity in the ECM, polarization occurs within the entire electrochromic device. In such polarization, a disassociation of ions occurs in the fast ion conductor creating free light ions of the required charge. These light ions move into the ECM because of the electrical field. Once in the ECM, they bond themselves to the molecules of the ECM.

As has been described above, depending on the charge of the bonding ion and its associated electron or hole, oxidation or reduction of the ECM occurs. These ECM materials are normally multivalent state materials exhibiting different optical absorption and dispersion spectra corresponding to different oxidation states. For these ECM's, these different oxidation and reduction states are all stable under appropriate electric field conditions.

In the base ECM, the metal valance states are generally at the maximum, whereby such metal oxides in their base state exhibit the lowest optical absorption. They are generally good insulators with high energy gaps, optically transparent and colorless in such a condition. On the other hand, oxygen deficient oxides as well as reduced oxides created as a result of the application of electric field exhibit higher optical absorption than those of base oxides. When oxygen deficient, ECM's exhibit a selective absorption when they are in one of their other oxidation states. Different ECM exhibit different colors, depending upon the spectral location of the selective absorption bands of that particular oxygen deficient metal oxide.

The explanation so far set forth above of cathodic and anodic ECM is my best explanation. It is possible to reduce this theory of mine to electrochemical equations in which a base ECM, acting as a cathodic material, would be subjected to a reduction by inclusion in the ECM of positive light ions and negative electrons or by extraction from the ECM of negative light ions and holes respectively to the fast ion conductor and the cathode in order to reduce the cathodic ECM to its colored state.

In a similar manner, an electrochemical equation may be written for an anodic ECM in the same manner. In this case, the inclusion of negative light ions and holes in the ECM or the extraction of positive light ions and negative electrons respectively to the fast ion conductor and the anode is sufficient to oxidize the anodic material to a colored state.

I personally conducted a search in the U.S. Patent and Trademark Office on the subject matter of this specification. As a result of that search, I uncovered only two patents which I felt were remotely associated with the subject matter to be taught as the invention herein. The patents were U.S. Pat. Nos. 4,298,448, and 4,652,090.

U.S. Pat. No. 4,298,448 issued on Nov. 3, 1981 for an "Electrophoretic Display". This patent discloses an electrophoretic display including a cell having two plates spaced apart and provided at least regionally with electrodes. At least one of the plates and an associated electrode facing an observer are transparent. The cell contains a suspension consisting of an inert dielectric liquid phase and a dispersed solid phase which at least in part are optically discriminate electrophoretic particles. The individual electrophoretic particles each are of practically the same density as the liquid phase. At least some of the electrophoretic particles are provided with a coating of organic material which is solid at the cell operating temperature but which melts at higher temperatures. The coating contains at least one charge control agent, preferably a salt of a divalent metal or metal of higher valency and of an organic acid, which imparts a well defined, uniform surface charge and a well defined, uniform surface potential to the particles. In essence, this patent teaches a very difficult to prepare electrophoretic display device.

U.S. Pat. No. 4,652,090 issued on Mar. 24, 1987 for a "Dispersed Iridium Based Complementary Electrochromic Device". This patent discloses an electrochromic device including one electrode layer, a cathodically coloring electrochromic layer, an ion conductive layer if required, a reversibly oxidizable layer and another electrode layer. At least one of the electrode layers is transparent. At least one of the cathodically coloring electrochromic layer, the ionic conductive layer and the reversibly oxidizable layer is adapted to contain protons or include a proton source for emitting protons upon application of a voltage. The reversibly oxidizable layer comprises a transparent dispersion layer which is made by vacuum thin film formation techniques of thick-film processes and comprises a metal iridium, iridium oxide or iridium hydroxide disperse phase and a transparent solid dispersion medium. As an alternate, the reversibly oxidizable layer and the other electrode are replaced with a single transparent conductive dispersion material layer which is made by vacuum thin film formation techniques of thick-film formation techniques or thick-film processes and comprises a metal iridium iridium oxide or iridium hydroxide disperse phase and a transparent solid dispersion medium.

It is an object of this invention to provide a new electrochromic device.

It is a feature of this invention that a new electrochromic device is provided in which both electrochromic particles and ion producing particles are supported in the same matrix.

It is an advantage of this invention that a new electrochromic device is provided in which both electrochromic particles and ion producing particles are supported in the same matrix.

It is another object of this invention to provide a method of making an electrochromic layer.

It is another feature of this invention to provide a method of making an electrochromic layer in which both electrochromic particles and ion producing particles are supported in the same matrix.

It is another advantage of this invention that a method is provided for making an electrochromic layer in which both electrochromic particles and ion producing particles are supported in the same matrix.

DISCLOSURE OF THE INVENTION

This invention is directed to a new electrochromic device. In accordance with the invention the device has a first and a second electrode. An electrochromic layer is located between the first and the second electrodes. The electrochromic layer comprises an inorganic based bulk material supporting electrochromic particles and ion producing particles in fixed but generally distributed positions therewithin. The bulk material permits migration of ions produced by the ion producing particles to and from the electrochromic particles upon change in voltage between the first and second electrodes. The bulk material also prohibits the passage of electrons therethrough when a voltage is applied between the first electrode and the second electrode, whereby an electric field is built up between the first and second electrodes which causes migration of the ions.

In accordance with details of preferred embodiments of the invention, one or both of the electrodes are transparent electrodes. Preferably the inorganic based bulk material includes aluminum oxide, or tantalum oxide, or silicon oxide, or a mixture of two or more of these compounds. The electrochromic particles may be anodic electrochromic particles or cathodic electrochromic particles or even mixtures of the two types of electrochromic particles. Preferably, all of the anodic or cathodic electrochromic particles are the same.

Also in accordance with my invention, a method of making a material which can form an electrochromic layer is taught. The method has the following steps. An inorganic based material, electrochromic particles and ion producing particles are mixed together and then applied to one of the electrodes by thermally evaporating the mixture in a vacuum of about $10^{-4}$ torr. The mixture is spaced from the electrode it is to coat by a distance of about 10 cm. The inorganic based material is one which permits migration of ions therethrough but prohibits passage of electrons therethrough. In such a manner a inorganic bulk material supporting electrochromic particles and ion product particles in fixed but generally distributed positions therewithin, whereby an electrochromic device is prepared.

In accordance with details of preferred embodiments of the invention, the inorganic based bulk material includes aluminum oxide, or tantalum oxide, or silicon oxide, or mixtures of two or more of these compounds. The electrochromic particles may be anodic electrochromic particles or cathodic electrochromic particles or even mixtures of the two types of electrochromic particles. Preferably, all of the anodic or cathodic electrochromic particles are the same.

BRIEF DESCRIPTION OF THE DRAWINGS

The novel features that are considered characteristic of the invention are set forth with particularity in the appended claims. The invention itself, however, both as to its organization and its method of operation, together with additional objects, features and advantages thereof, will best be understood from the following description of specific embodiments when read in connection with the accompanying drawings in which:

FIGS. 1 and 2, as previously discussed, are schematic illustrations respectively of the operation of a cathodic electrochromic device and of an anodic electrochromic device.

DESCRIPTION OF THE PREFERRED EMBODIMENTS

The following description is what I consider to be the preferred embodiments of my invention. The following description also sets forth what I now contemplate to be the best mode of construction for an inventive electrochromic device. The description is not intended to be a limitation upon the broader principles of this invention.

Figure 3:
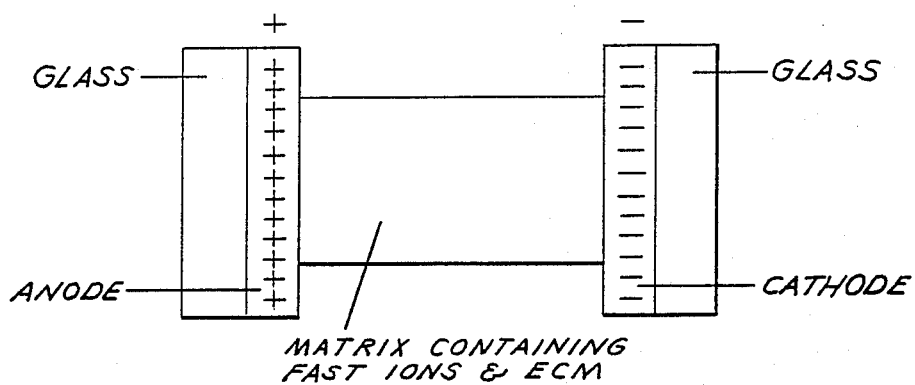
FIG. 3 is a schematic illustration of an operational mode of an electrochromic device in accordance with this invention.
Figure 4:
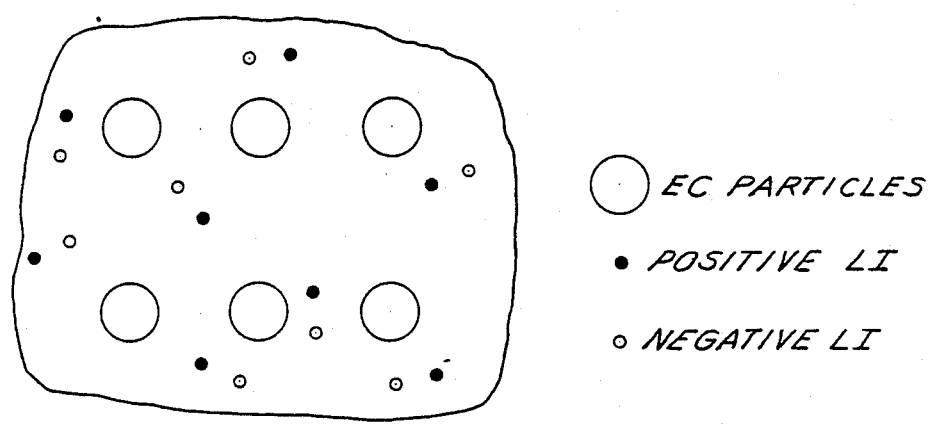
FIGS. 4 and 5 are enlarged schematic illustrations of a matrix material used in the electrochromic device of FIG. 3 showing in FIG. 4 the matrix material without an electric field applied thereto and in FIG. 5 the matrix material with an electric field applied thereto.
Figure 5:
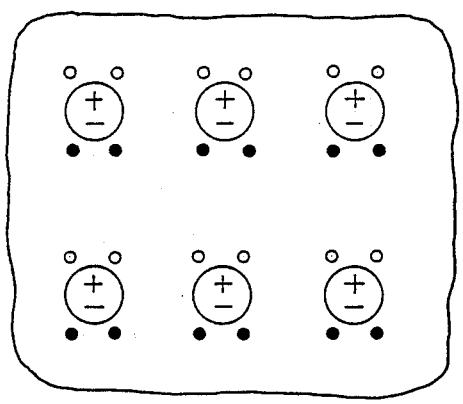

FIGS. 3 through 5 schematically illustrate the electrochromic device of my invention. FIG. 4 illustrates the matrix material with no electric field present and FIG. 5 illustrates the matrix material with an electric field present. The electrochromic device may be fabricated to have anodic electrochromic properties or cathodic electrochromic properties, or both, as desired.

Reference is now made to FIG. 3. In this preferred embodiment, an anodic ECM is disclosed. A first glass sheet has an anode thereon and a second glass sheet has a cathode thereon. In both cases, in accordance with the preferred embodiment of my invention, the glass sheets have a thickness of ⅛ inch and the electrodes have a thickness of about 2000 angstroms. In accordance with the teachings of the preferred embodiment, both the anode and the cathode are formed from tin oxide doped with fluorine. Such a coating may be applied to the glass sheet by a pyrolytic process, as is well-known in the art. It is, of course, apparent that other electrode materials may be used and other materials may be substituted for the glass sheets, for example, quartz, plastic, etc. Generally, one, or both, of the electrode supports should be transparent so that the colors developed in the electrochromic material may be viewed.

As shown in FIG. 3 in the preferred embodiment, a matrix material is provided that supports therein both finely divided ion producing material and finely divided electrochromic material between the cathode and the anode. An example of the preparation of a matrix material supporting therein both finely divided ion producing material and finely divided electrochromic material is set forth below.

EXAMPLE

The matrix material was prepared by mixing on a volume basis 1% LiCl, the ion producing material, 60% $Al_2O_3$, the inorganic based bulk material, and 39% $WO_3$, the electrochromic material. This mixture was loaded into a tantalum boat which was heated to a temperature below the evaporation of the mixture for one-half hour to insure that the compounds forming the mixture are in their base state. The temperature of the mixture is then raised to its evaporation temperature and the thermal evaporation was carried out at a pressure of approximately $10^{-4}$ torr of vacuum. The mixture was placed about 10 cm from the electrode to be coated.

In this manner, the inorganic based bulk material supporting electrochromic particles and ion producing particles in fixed but generally distributed positions therewithin was applied to the electrode. After this preparation, a second electrode was applied to the exposed inorganic based bulk material to form an electrochromic device.

As stated above, the finely divided electrochromic material added to the mixture was $WO_3$. The amount of $WO_3$ added to the mixture is the amount of $WO_3$ that would be required to produce a layer having a thickness of 4000 A° on one of the electrodes. A range of $WO_3$ additions would be sufficient $WO_3$ to produce a layer having a thickness in a range from 3000 A° to 5000 A°. The electrochromic $WO_3$ is a cathodic electrochromic material.

The inorganic based bulk matrix material supporting therein the finely divided ion producing material and the finely divided electrochromic material in fixed but generally distributed positions is then positioned between the two electrodes as is shown in FIG. 3. The matrix material has a thickness which depends on the type of material used and the type of materials added thereto. In the preferred case, the matrix has a thickness of about 6000 A°. Since $WO_3$ is a cathodic material, when a negative five volts was applied between the anode and the cathode, a blue color resulted in the electrochromic device.

The production of the blue color may be explained by aid of FIGS. 4 and 5. FIG. 4 shows a schematic illustration of the matrix containing the finely divided ion producing material and the finely divided electrochromic material in a condition where no voltage is applied to the anode and the cathode of the electrochromic device of FIG. 3. In this case the electrochromic particles do not have a charge associated therewith and the ions, both positive and negative, are randomly positioned.

When the voltage is applied to the electrochromic device as described above, then the electrochromic particles do have a charge (polarization phenomenon) associated therewith as shown in FIG. 5 by the plus and minus signs on the electrochromic particles. When this charging occurs, positive light ions drifting due to the applied field are drawn to the negative end of the electrochromic particles and negative light ions are drawn to the positive end of the electrochromic particles. This action causes a reduction of the electrochromic $WO_3$ and results in the production of the blue color.

In accordance with the teachings of this invention, various materials may be used to form the inorganic bulk material. For example, aluminum oxide, or tantalum oxide, or silicon oxide, or other known solid ion conductors, or a mixture of two or more of these compounds may be used. The electrochromic particles may be made from any suitable electrochromic material or mixtures of such materials. The ion producing particles also may be selected from any material which produces the desired ions. Other deposition techniques can be used to produce matrix electrochromic layers than the illustrated thermal evaporation technique. For example, such techniques as sputtering, spray, sol-gel, CVD, or other known techniques can be employed the form the matrix electrochromics.

While the above Example shows the use of a cathodic electrochromic particles embedded in the matrix, it is possible to embed both cathodic and anodic particles in the matrix at the same time. If this is done, it is preferred that the two types of particles have about the same switching times between their uncolored and colored states. Also, if just anodic or cathodic particles are to be used, the particles may be mixtures of various types of anodic or cathodic particles. Again, it is preferred that the various types of particles have about the same switching times between their uncolored and colored states.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

I claim:

1. An electrochromic device which comprises:
   a first electrode;
   a second electrode;
   an electrochromic layer between said first and said second electrodes comprising:
   an inorganic based solid material supporting electrochromic particles and ion producing particles in fixed but generally distributed positions therewithin, said solid material permitting migration of ions produced by said ion producing particles to and from said electrochromic particles upon change in voltage between said first and second electrodes, said solid bulk material also prohibiting the passage of electrons therethrough when a voltage is applied between said first electrode and said second electrode, whereby an electric field is built up between said first and second electrodes which causes migration of said ions.

2. The electrochromic device of claim 1 wherein: one of said first or second electrodes is a transparent electrode.

3. The electrochromic device of claim 1 wherein: both said first and said second electrodes are transparent electrodes.

4. The electrochromic device of claim 3 wherein: said inorganic based material includes aluminum oxide.

5. The electrochromic device of claim 3 wherein: said inorganic based solid material includes tantalum oxide.

6. The electrochromic device of claim 3 wherein: said inorganic based solid material includes silicon oxide.

7. The electrochromic device of claim 1 wherein: said electrochromic particles are anodic electrochromic particles.

8. The electrochromic device of claim 7 wherein: said anodic electrochromic particles are all the same.

9. The electrochromic device of claim 1 wherein: said electrochromic particles are cathodic electrochromic particles.

10. The electrochromic device of claim 9 wherein: said cathodic electrochromic particles are all the same.

11. The electrochromic device of claim 1 wherein: said electrochromic particles are a mixture of both anodic and cathodic electrochromic particles.

12. The electrochromic device of claim 11 wherein: said anodic electrochromic particles are all the same and said cathodic electrochromic particles are all the same.

13. A method of making a material which can form an electrochromic layer which comprises the steps of:
   applying an inorganic solid material permitting the migration of ions therethrough but prohibiting the passage of electrons therethrough, electrochromic particles, and ion producing particles to an electrode by thermally evaporating a mixture of said inorganic solid material, electrochromic particles, and ion producing particles in a vacuum of about $10^{-4}$ torr with said mixture and said electrode being spaced from one another by a distance of about 10 cm.

14. The method of claim 13 wherein: said electrochromic material is a finely divided anodic electrochromic material.

15. The method of claim 14 wherein: said finely divided anodic electrochromic material is all the same.

16. The method of claim 13 wherein: said finely divided electrochromic material is a finely divided cathodic electrochromic material.

17. The method of claim 16 wherein; said finely divided cathodic electrochromic material is all the same.

18. The method of claim 13 wherein: said electrochromic material is a mixture of both finely divided anodic electrochromic material and finely divided cathodic electrochromic material.

19. The method of claim 18 wherein: said finely divided anodic electrochromic material is all the same and said finely divided cathodic electrochromic material is all the same.

20. The method of claim 13 wherein: said inorganic based solid material includes aluminum oxide.

21. The method of claim 13 wherein: said inorganic based solid material includes tantalum oxide.

22. The method of claim 13 wherein: said inorganic based solid material includes silicon oxide

* * * * *